G. SWEET.
Machines for Fitting Spokes to Fellies.
No. 147,293. Patented Feb. 10, 1874.
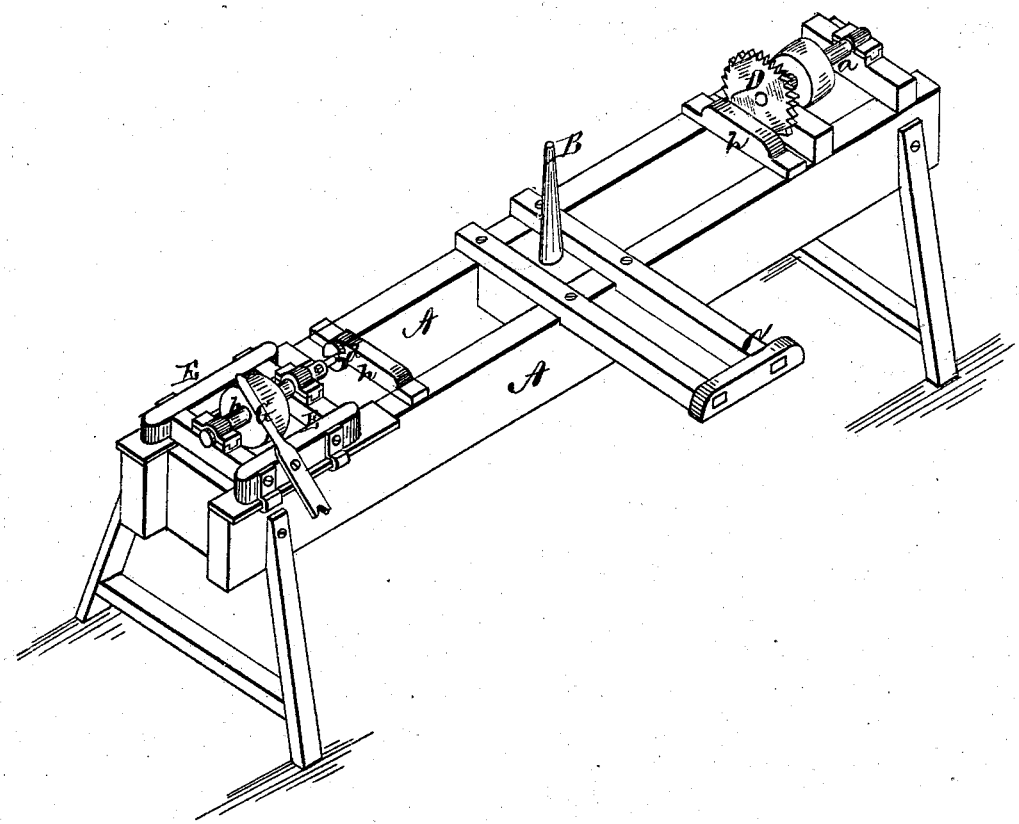
Witness:
Franck L. Ousand
C. L. Evert
Inventor.
George Sweet
per
Alexander _____
Attorneys.

UNITED STATES PATENT OFFICE.

GEORGE SWEET, OF DANSVILLE, NEW YORK.

IMPROVEMENT IN MACHINES FOR FITTING SPOKES TO FELLIES.

Specification forming part of Letters Patent No. 147,293, dated February 10, 1874; application filed March 21, 1873.

*To all whom it may concern:*

Be it known that I, GEORGE SWEET, of Dansville, in the county of Livingston and in the State of New York, have invented certain new and useful Improvements in Machine for Fitting Spokes to Fellies; and do hereby declare that the following is a full, clear, and exact description thereof, reference being had to the accompanying drawings, and to the letters of reference marked thereon, making a part of this specification.

The nature of my invention consists in the construction and arrangement of a machine for fitting spokes for fellies of wheels, as will be hereinafter more fully set forth.

In order to enable others skilled in the art to which my invention appertains to make and use the same, I will now proceed to describe its construction and operation, referring to the annexed drawing, which represents a perspective view of my machine.

A represents a frame of suitable dimensions, and supported in any convenient manner. In the center of this frame is a standard, B, of such size that the hub of the wheel will fit on the same, and a rest, C, extending to one side of the frame to drive the spoke over into the hub. At one end of the frame A is a circular-saw, D, mounted upon a revolving arbor, a, for cutting off the end of the spoke. At the other end of the frame is a sliding carriage, E, moved by a lever, G, and carrying longitudinally an arbor, b, with a hollow auger, d, on the inner end to make the tenon of the spoke h h are rests upon which the end of the spoke is supported while being operated upon by the saw D or auger d.

It will be understood that the frame is suitably braced to the floor or wall of the premises where it is used. The hub is placed on the spindle B, so that its lower end will lie down in the groove formed in the rest C. The spokes are then driven in the sockets in the hub, the outer ends of the spokes being steadied on the rest C. After the spokes are all in the hub, the tenons are made by the auger, and the ends sawed off by the saw.

I am aware of the patent granted to John Sitton, October 14, 1856, for certain improvements in wheelwrights' machine; hence I disclaim the devices therein shown and claimed as being my invention.

Having thus fully described my invention, what I claim as new, and desire to secure by Letters Patent, is—

The grooved rest C extended to one side of the frame A, as shown, in combination with the spindle B, saw D, and auger d, and the rests h h, all as and for the purposes set forth.

In testimony that I claim the foregoing I have hereunto set my hand and seal this 21st day of February, 1873.

GEORGE SWEET. [L. S.]

Witnesses:
F. B. GRANT,
A. HAMMOND.